March 4, 1958     D. C. COX     2,825,456
ARTICLE CATCHER FOR SORTING MACHINE
Filed Jan. 8, 1953     4 Sheets-Sheet 1
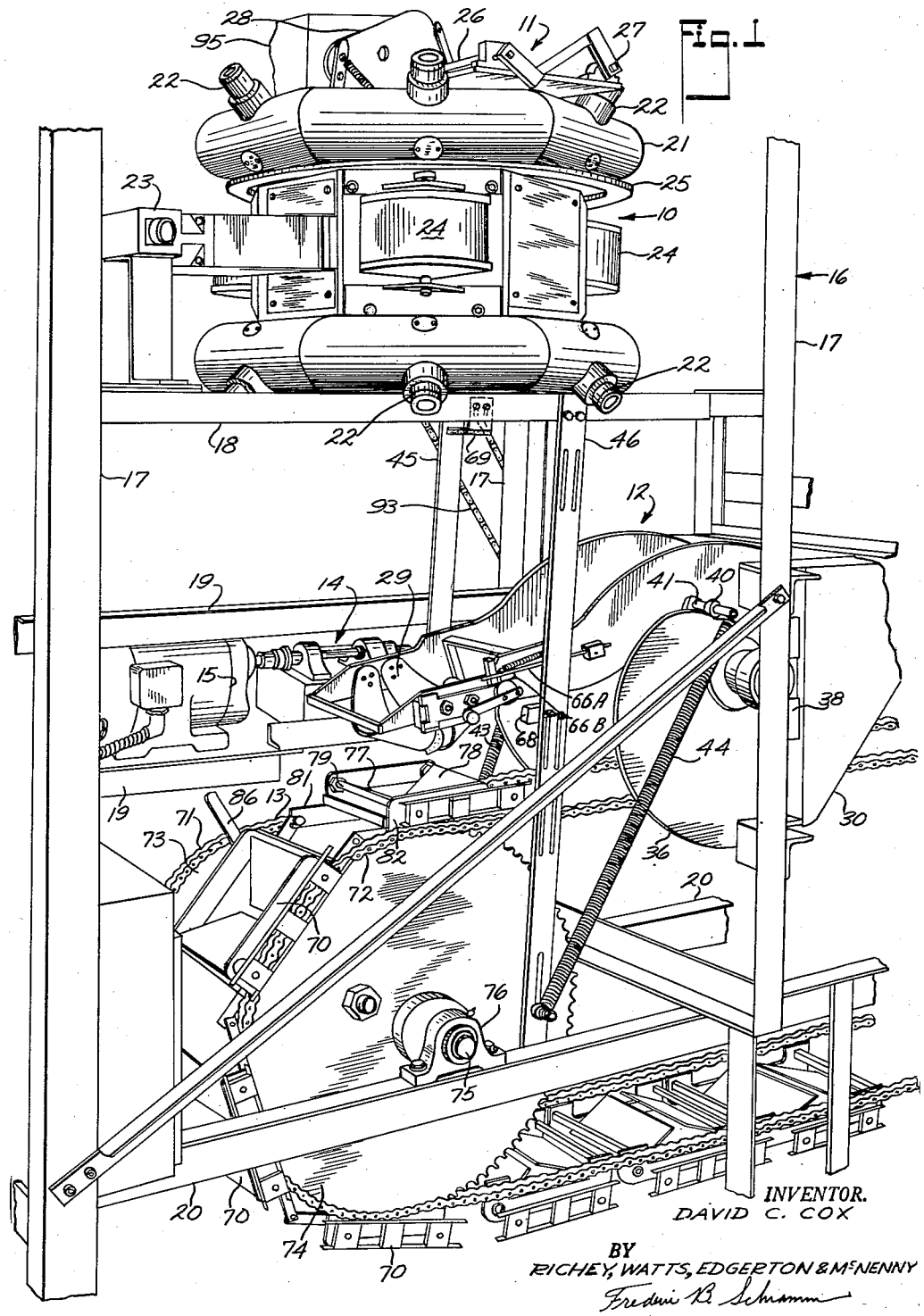
INVENTOR.
DAVID C. COX
BY
RICHEY, WATTS, EDGERTON & McNENNY
Frederic B. Schramm
ATTORNEYS

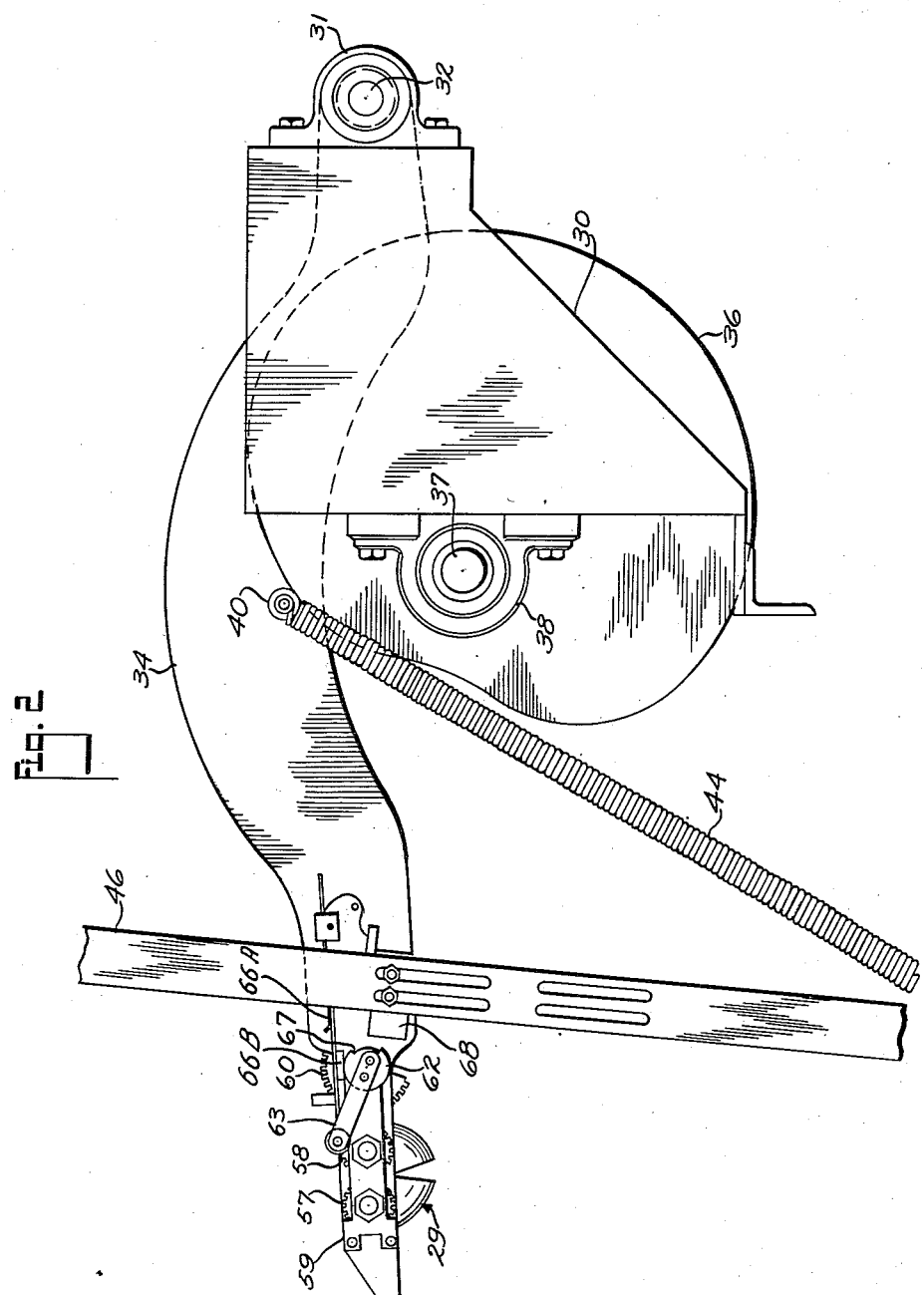

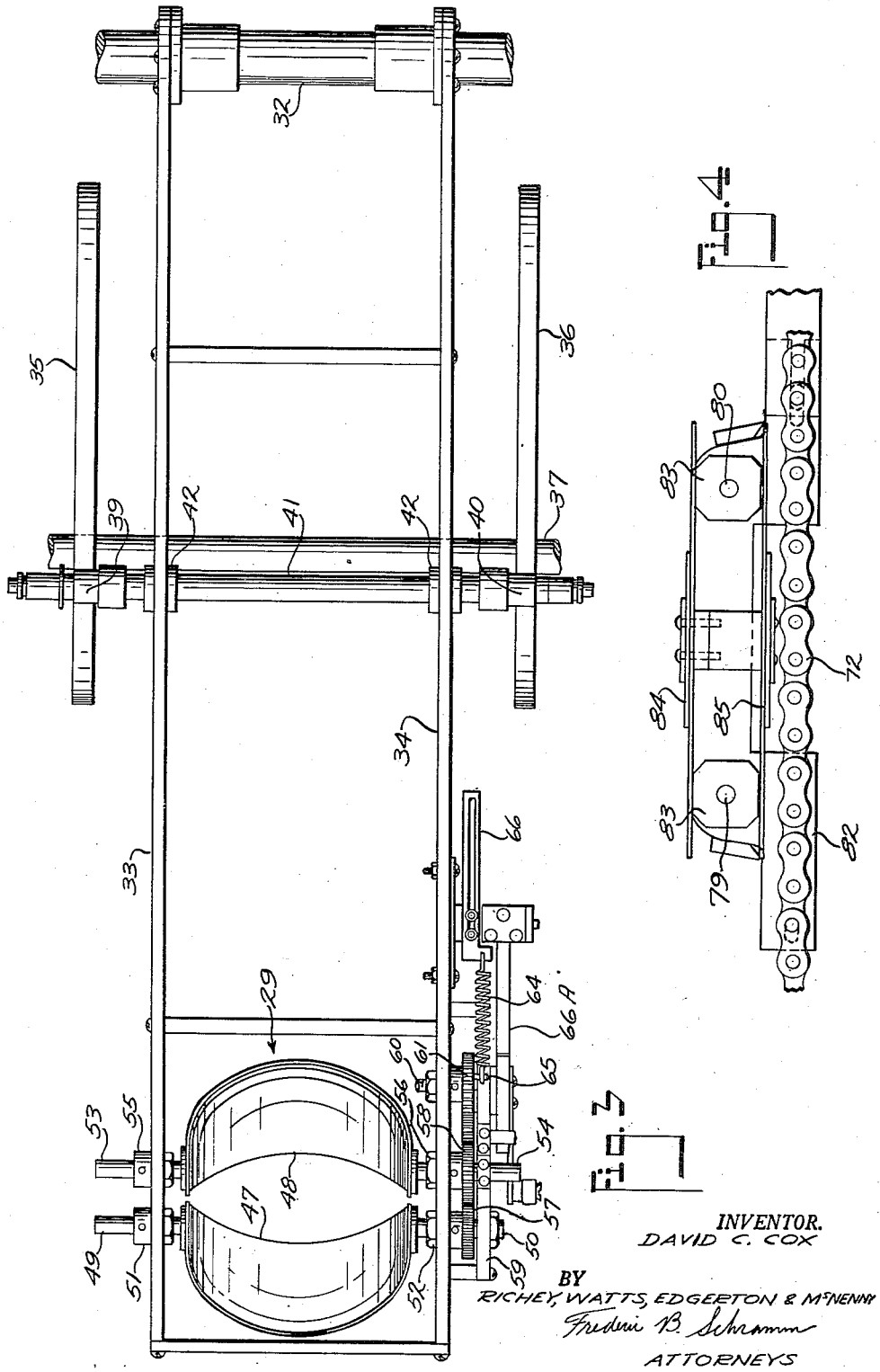

March 4, 1958 D. C. COX 2,825,456
ARTICLE CATCHER FOR SORTING MACHINE
Filed Jan. 8, 1953 4 Sheets-Sheet 4

INVENTOR.
DAVID C. COX
BY
RICHEY, WATTS, EDGERTON & McNENNY
Frederic B. Schramm
ATTORNEY

United States Patent Office 2,825,456
Patented Mar. 4, 1958

2,825,456

ARTICLE CATCHER FOR SORTING MACHINE

David C. Cox, Grand Rapids, Mich., assignor to Mandrel Industries, Inc., a corporation of Michigan Application January 8, 1953, Serial No. 330,238

15 Claims. (Cl. 209—73)

This invention relates to apparatus for sorting articles and, more particularly, to apparatus for determining the surface characteristics of articles while the articles are falling freely and for catching the articles and depositing them in moving conveyors without damage.

An object of the invention is to sort articles such as fruit by photoelectric inspection while the fruit is falling freely and to accomplish the inspection and subsequently assort the fruit without inflicting bruises upon the fruit.

An object of the invention is to catch articles which have been inspected while the articles are falling freely and to deposit them upon a conveyor without damage to the articles.

Another object of the invention is to catch articles which are falling freely by means of a catcher which is traveling at substantially the same speed as the article at the time it is caught and which then rapidly decelerates prior to transferring the article to a conveyor.

A still further object of the invention is to correlate the article release, catching and conveying operations of a sorting machine of the type with which the invention is concerned, so that each operation is successively performed at precisely timed intervals.

There are described in U. S. patent applications, Serial Nos. 294,427 and 265,862, filed June 19, 1952, and January 4, 1952, respectively, by D. C. Cox, novel methods and apparatus for inspecting fruit and the like according to the surface characteristics of each specimen such as, for example, by color. The fruit is inspected by a photoelectric system which illuminates each specimen and directs the reflected light upon a photoelectric cell. The variations in photoelectric current due to the variations in color, etc. are then utilized to control various diverter gates or the like for separating the specimens into different grades, each grade corresponding to a level of response from the photoelectric cell.

The features and advantages of such a sorting method and apparatus are determined largely by the fact that the fruit is illuminated while the fruit is falling freely in air and out of contact with supporting elements of any kind. The entire surface of each specimen of fruit can, therefore, be scanned and every variation in color and every blemish or fault on the surface of the specimen affects the photoelectric cell.

It is requisite in the successful operation of the apparatus described above that the specimens of fruit be handled extremely carefully both prior to the inspection operation by the photoelectric system and also after such inspection. Particularly, the inspection operation is performed while the specimen is falling freely, and the specimen must be caught and its speed reduced to substantially zero without damaging the specimen in any way. It is particularly important where the inspection procedure is being carried out with respect to ripe fruit, such as peaches, which have easily bruised skins. Further, it is necessary that whatever method be adopted for the catching of such specimens, it be operable at high speeds and at precisely timed intervals in order that the practical advantages of an automatic photoelectric sorting system may be utilized.

The present invention is concerned with a novel method of and apparatus for accomplishing the above-referenced objects and accomplishing the afore-mentioned desirable purposes and results. Particularly, in accordance with the present invention, there is provided a catcher which is adapted to receive and hold the specimens of fruit as they leave the inspecting head while the catcher is traveling at a speed substantially equal to that of the specimen. The catcher comprises a novel arrangement incorporating two cantilever arms which are pivoted about a suspension so that a pan at the end of the arms travels along an arcuate path which extends between the lower extremity of the inspection head and a point directly above a conveyor which is utilized to carry away the successive specimens of fruit after inspection. The cantilever arms are reciprocated by rotating cams which engage the arms at a point intermediate the ends of the arms. The cams are particularly shaped so as to produce the necessary velocities and accelerations at the end of the arms carrying the pan. The cams are driven in synchronism with the gate or other release means associated with the inspecting head and in synchronism with the conveyor upon which the specimens are dropped so that all necessary operations are performed in the correct sequence and at properly timed intervals for each specimen inspected.

Further objects, features and advantages of the invention will be more readily understood from a consideration of the following detailed specification and claims taken in connection with the accompanying drawings, in which:

Fig. 1 is a perspective view showing a portion of the sorting machine of the invention and illustrating particularly the relation of the catcher of the invention to the inspection head and the conveyor of the machine;

Fig. 2 is a side elevation view of the catcher;

Fig. 3 is a top plan view of the catcher;

Fig. 4 is a side view of a portion of the conveyor and showing particularly the conveyor pan support and detent mechanism therefor;

Figure 5:
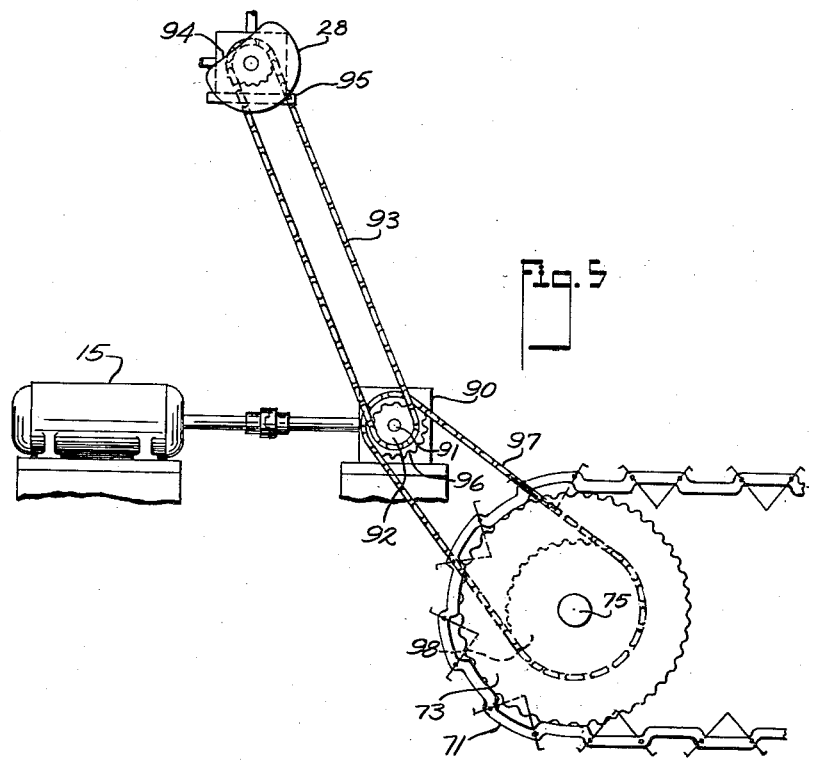
Fig. 5 is a representation of a front elevation view of the drive mechanism.

Referring now to Fig. 1, the sorting machine of the invention comprises an inspection head 10 which includes a photoelectric inspection apparatus; a release mechanism 11 for dropping specimens of fruit at timed intervals; a catcher mechanism 12 for catching the specimens after they leave the inspection head; a conveyor 13 for receiving the specimens from the catcher 12 and conveying them to an assorting apparatus which forms a part of the machine; and a drive apparatus 14 including an electric motor 15.

The sorting machine is constructed with a frame 16 including upright members 17 and cross members 18, 19 and 20. The inspection head 10 is suitably mounted upon and supported by the cross members 18. The inspection head 10 comprises a housing 21, lamp mountings 22 and an enclosure 23 for a photoelectric cell. The inspection head has an opening vertically through the housing which serves as a passage for the specimens of fruit. A number of background elements 24 are utilized to provide a basis of comparison for light reflected from the specimens and a drive ring 25 controls the position of the background members.

The release mechanism 11 is mounted at the top of the housing 21 and serves to drop the specimens of fruit into the vertical opening at timed intervals. The release mechanism comprises two gate members which are mounted upon and rotated by two shafts 26 and 27 driven by a cam 28. The release mechanism and its associated drive mechanism are illustrated and described in detail in my copending application, Serial No. 326,496, filed December 17, 1952. The drive mechanism including the cam for operating the gate members constitutes one aspect of the present invention as described hereinbelow.

The catcher 12 receives the specimens of fruit after they have fallen through the vertical opening of the inspection head 10 and deposits them upon the conveyor 13. It will be recognized that, after the specimen of fruit leaves the inspection head, it is falling at a substantial speed; and, if it were allowed to fall directly into a conveyor without some provision for reducing the speed of fall, it would be bruised or otherwise damaged. The catcher 12 is so designed and constructed that a holder 29 is moved at a speed substantially equal to that of the specimen of fruit at the time the fruit is received in the holder and then rapidly decelerated to a substantially rest position before dropping the fruit into the conveyor 13.

The catcher 12 includes two mounting members 30 which are supported by the upright members 17 of the frame. Two bearings 31, attached to the members 30 at the rear thereof, serve to support a shaft 32 which, in turn, supports the extremity of arm means compressing two cantilever arms 33 and 34. The cantilever arms 33 and 34 pivot freely upon the shaft 32 so that the holder 29 moves along an arc extending from a point just below the inspection head 10 to a point adjacent the conveyor 13. The cantilever arms are moved along this path by two cams 35 and 36 which are mounted upon a shaft 37. The shaft 37 is supported from the mounting member by two bearings 38 and is driven by the motor 15 through a gear mechanism. The cam surfaces engage rollers 39 and 40 which are mounted upon and rotate freely upon a shaft 41 extending transversely through the cantilever arms 33 and 34. Collars 42 engage the cantilever arms so that the shaft 41 serves as a spacer. Two springs 43 and 44 extend between the ends of the shaft 41 and two upright members 45 and 46 to maintain the rollers 39 and 40 in engagement with the surfaces of the cams while the cams are rotating. The springs 43 and 44 must, of course, exert sufficient tension so that the inertia effects due to the mass of the arms are overcome during periods of deceleration.

Figure 6:
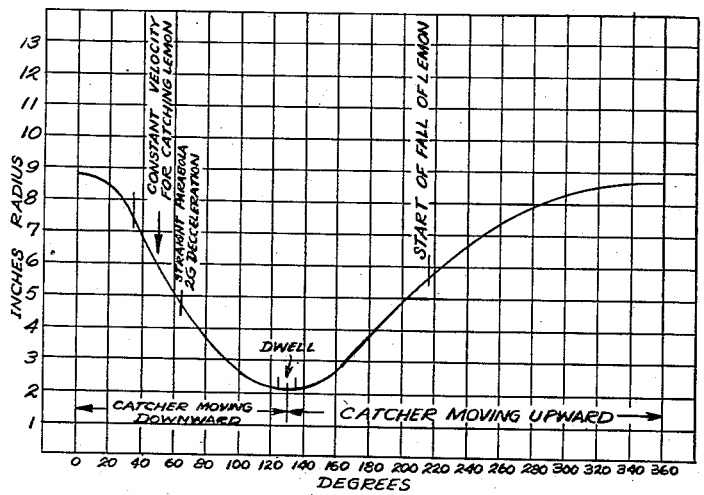
Fig. 6 is a contour diagram of the catcher arm and showing particularly the points of inflection of the cam surfaces.

The cams are so shaped that the holder 29 is traveling at an optimum velocity at the time of receiving the fruit and is then rapidly decelerated at a substantially rest position. A contour diagram for the cam is shown in Fig. 6 with the important points indicated thereon.

The holder 29 comprises two generally arcuate pan members 47 and 48 which are mounted upon and supported by the cantilever arms 33 and 34. The ends of the pan member 47 are secured to shafts 49 and 50 which rotate in bushings 51 and 52 mounted on the arms 33 and 34. The ends of pan member 48 are correspondingly supported by shafts 53 and 54, which rotate in bushings 55 and 56. The shafts 50 and 54 carry two pinion gears 57 and 58 and are further supported by a bearing member 59 which is spaced from the cantilever arm 34. A shaft 60 supports a third pinion 61 between the member 59 and the arm 34 and carries a detent 62 and an actuating arm 63 at the outer extremity of the shaft. The pan members 47 and 48 are actuated by rotation of the pinion 61 which drives the pinions 57 and 58 and the shafts 50 and 54 in opposite directions.

The pinion 61 is operated so as to hold the pan members 47 and 48 in a normally open position by a spring 64 which extends between a pin 65 carried by the pinion 61 and an adjustable tension member 66.

The pan members 47 and 48 are held in a closed position by a detent spring 66A, carrying a rectangular dog 66B which engages the shoulder 67 of the detent member 62. As is set forth in the description of the operation of the apparatus, the detent spring engages a fixed trip block 68 carried by the upright member 46 to release the detent and to cause the pan members 47 and 48 to rotate into an open position. The pan members are closed by engagement of the actuator arm 63 with a similar fixed trip block 69. Upon rotation of the actuator arm, the detent spring 66 engages the shoulder 67.

The conveyor 13 includes a number of carriers 70 which carry the specimens of fruit from the catcher to an assorting mechanism which forms a part of the sorting machine. The carriers 70 are secured to and moved by two endless conveyor chains 71 and 72 which pass over two sprocket wheels 73 and 74. The sprocket wheels 73 and 74 are mounted for rotation upon a shaft 75 which is supported by bearings 76 upon the lower cross members 20. As shown in Fig. 5, the conveyor chains are driven in synchronism with the drive mechanism for the catcher and release mechanism.

The construction and operation of the conveyor is described in detail in connection with the assorting apparatus of the sorting machine in my copending application Serial No. 377,942 filed September 1, 1953. For the purposes of the present application, the carriers are sufficiently shown in Figs. 1 and 4 and include two pan members 77 and 78 which are mounted upon two shafts 79 and 80 so that they may be opened and closed by rotation of the shafts. The shafts 79 and 80 are supported at their ends by elongated pieces 81 and 82 which are, in turn, carried by the two conveyor chains 71 and 72. The elongated pieces of successive carriers are interengaged as shown in Fig. 1 to stabilize the carriers while providing the necessary flexibility for movement in an endless path. As shown particularly in Fig. 4, each of the shafts 79 and 80 carries a square detent member 83 on an end which extends beyond the piece 82. The detent members 83 are engaged by two detent springs 84 and 85 which are supported by the elongated piece 82. The pan members 77 and 79 are thereby maintained in a normally closed position, unless opened by actuation of the lever 86, to rotate member 78. A similar lever is utilized to rotate pan member 77.

The arrangement of the conveyor pans and the associated detent mechanism is such that the detent springs impart a deceleration force to a specimen of fruit or other article which is dropped into the pan. Under certain circumstances, the falling articles may be received directly in the conveyor pans, although it is preferred that the catcher mechanism be utilized to accomplish a substantial reduction in speed of fall before the article contacts the conveyor pans.

Referring now to Fig. 5, the drive mechanism for the apparatus of the invention includes a drive motor 15 as previously mentioned. This motor drives a reducer mechanism 90 whose output shaft 91 is connected to the drive shaft 37 of the catcher cams through a suitable coupling (not shown). A drive sprocket 92 mounted upon the shaft 91 is engaged by a drive chain 93 which passes over a drive sprocket 94 of a gear box 95. The gear box 95 includes an integral gearing and has an output shaft which supports and rotates the drive cam 28 for the release mechanism. The gear box 95 also includes output drive shafts which are connected to and drive the conveyor which feeds the fruit to the release mechanism and the ring drive for the background members 24, as disclosed in the copending applications referred to. The sprocket wheel 73 for the conveyor 13 is driven from the sprocket 96 by a chain 97 and a sprocket 96 by a chain 97 and a sprocket 98. The sprocket 98 is mounted upon the shaft 75 and suitably coupled to the sprocket wheel 73.

It will be understood that by the employment of the cam drives herein shown, very advantageous results may be obtained in that the drive motor 15 may operate continuously at a uniform speed, and all the operations performed by the various components of the machine may be adjusted to operate at any predetermined rate and with the necessary time intervals between the successive operations.

In operation, the release mechanism 11 is actuated by the cam 28 so as to drop the specimen of fruit through the inspection head. As the specimen leaves the lower extremity of the housing of the inspection head, it falls into the holder 29 of the catcher which at that time is moving downwardly from the upper extremity of its arc of travel at a speed substantially equal to that with which the specimen is traveling. As the holder moves downward along its arc of travel, the catcher arms move at a speed which is reduced rapidly by reason of the form of the contours of the catcher cams 35 and 36. As the holder 29 reaches the lower extremity of its arc of travel at a point directly above the conveyor, it comes to rest and is allowed to remain in that position briefly by reason of the dwell portion of the cams (Fig. 6). At that time, a carrier 70 is positioned below the holder 29 which is opened by the spring 64 after the detent spring 66A is released by the fixed trip block 68 as the arms 33 and 34 reach the lowermost position in their travel. The fruit is then dropped into the carrier and carried to the assorter. As the drive cams 35 and 36 continue to rotate, the catcher arms are forced upward and the holder 29 moves toward the upper extremity of its arc of travel. The pan members 47 and 48 are closed during the upward movement of the arms by engagement of the actuator 63 with the upper fixed block 69. By this time, another specimen of fruit has been deposited in the release mechanism and the entire process is repeated.

This application is a continuation-in-part of application, Serial No. 294,427, filed June 19, 1952, by D. C. Cox.

It is to be understood that the specific nature of the present disclosure is not intended to be restrictive or confining and that various rearrangement of parts and modifications of design may be resorted to without departing from the scope or spirit of the invention as herein claimed.

What is claimed is:

1. In a sorting machine adapted to inspect an article while the article is falling freely, the combination of a release mechanism adapted to hold an article and to drop the article upon actuation thereof, catcher means with a mechanism for moving it in the path of fall of the object said catcher being adapted to receive the object while moving at a speed approximating that of the object and then decelerate to a substantially rest position, and drive means for actuating the said release mechanism and the said catcher moving mechanism in synchronism.

2. In a sorting machine adapted to inspect an article while the article is falling freely, the combination of a release mechanism comprising at least one gate member and a rotating cam for actuating the gate member to drop the article, catcher means below the gate member adapted to move in the path of fall of the article and to receive the article while moving at a speed approximating that of the article and then bring the article to a substantially rest position and comprising an article holder, arm means, fixed support means upon which the arm means is pivoted at one end thereof and the holder being carried at the remaining end of the arm means, drive means for reciprocating the arm means comprising a rotating cam operatively engaging the arm means intermediate the ends thereof, and drive means for the said release mechanism and the said catcher means including a motor and transmission means interconnecting the motor and the said cams, so connected that the catcher means makes one stroke for each operation of the release mechanism and is in downward travel at constant velocity after the release mechanism has operated to drop an article thereon.

3. In a sorting machine, the combination of a release mechanism comprising at least one gate member and a rotating cam for actuating the gate member to drop the article, the said cam having a substantially uniform contour around the greater part of the circumference thereof and an actuating contour along a relatively small part of the circumference thereof for intermittently operating the gate member, catcher means below the gate member adapted to move in a path of fall of the article and to receive the article comprising an article holder, arm means, fixed support means upon which the arm means is pivoted at one end thereof and the holder being carried at the remaining end of the arm means, drive means for reciprocating the arm means comprising a rotating cam operatively engaging the arm intermediate the ends thereof and the cam having a contour adapted to move the holder at a speed approximating that of the falling article and then rapidly bringing the holder to a substantially rest position, and drive means for the said release mechanism and the said catcher means including a motor and transmission means positively interconnecting the motor and the said cams, said cams being so mounted with respect to the transmission means that the catcher means makes one stroke for each operation of the release mechanism and is in downward travel at constant velocity after the release means has operated to drop an article thereon.

4. In a sorting machine adapted to inspect an article while the article is falling freely, the combination of a release mechanism adapted to hold an article and to drop the article upon actuation thereof, catcher means with mechanism for moving it in the path of fall of the article, said catcher being adapted to receive the article while moving at a speed approximating that of the article and then bring the article to a substantially rest position, the said catcher means including an article holder comprising at least one pan member adapted to be rotated to open and close the holder, and means for opening the said holder to release the article as the catcher reaches the rest position.

5. In a sorting machine adapted to inspect an article while the article is falling freely, the combination of a release mechanism adapted to hold an article and to drop the article upon actuation thereof, catcher means below the release mechanism having mechanism for moving it in the path of fall of the article, said catcher being adapted to receive the article while moving at a speed approximating that of the article and then bring the article to a substantially rest position, the said catcher means including an article holder comprising at least one pan member adapted to be rotated to open and close the holder, and means for opening the said holder to release the article as the catcher reaches the rest position comprising a rotary lever operatively connected to the pan member and a trip block adapted to be engaged by the lever.

6. In a sorting machine adapted to inspect an article while the article is falling freely, the combination of a release mechanism adapted to hold an article and to drop the article upon actuation thereof, catcher means with mechanism for moving it in the path of fall of the article, said catcher means being adapted to decelerate the article to a substantially rest position, and including article holding means adapted to be opened to release the articles.

7. In a sorting machine adapted to inspect an article while the article is falling freely, the combination of a release mechanism comprising a gate member and a rotating cam for actuating the gate member to drop an article, catcher means with mechanism for moving it up and down in the path of fall of the article, said catcher means being adapted to receive the article while moving at a speed approximating that of the article and comprising an article holder, arm means, fixed support means upon which the arm means is pivoted at one end thereof and the holder being carried at the remaining end of the arm means, and conveyor means positioned so as to move along a path adjacent the lowermost position of the catcher means and comprising a conveyor chain and a plurality of carriers spaced along the conveyor chain, drive means for the said release mechanism and the said catcher means comprising a motor and transmission means positively connecting the said motor to the said catcher cams and the said release mechanism cam, drive means for said conveyor synchronized with said catcher drive means to bring a carrier into position under the catcher means for each cycle of the movement of the catcher means, and means for opening the said article holder to drop the article into a carrier as the catcher reaches the lowermost position.

8. In a sorting machine adapted to inspect an article while the article is falling freely, the combination of a release mechanism for intermittently dropping articles and comprising a gate member and a continuously rotating cam for actuating the gate member, catcher means, cam mechanism for moving the catcher means vertically in the path of fall of the article, said catcher means being adapted to receive each article while moving downward at a speed approximating that of the article and comprising an article holder, an arm, fixed support means upon which the arm is pivoted at one end thereof and the holder being carried at the remaining end of the arm, and conveyor means positioned so as to move along a path adjacent the lowermost position of the catcher means and comprising a continuously moving conveyor chain and a plurality of carriers spaced along the conveyor chain, drive means for the said release mechanism and the said catcher means comprising a motor and transmission means positively connecting the said motor to the said catcher cam mechanism and the said release mechanism cam, and drive means synchronized with the catcher cam mechanism for operating the said conveyor to bring a carrier adjacent the lowermost position of the holder each time the catcher reaches the lowermost position, and means for opening the said article holder to drop an article into a carrier as the catcher reaches the lowermost position.

9. In a sorting machine adapted to inspect an article while the article is falling freely an inspection head which has an opening for the passage of falling articles, a frame adapted to support the inspection head, a conveyor for carrying articles from the inspection head to an assorting apparatus after inspection comprising a conveyor chain carrying a plurality of spaced carriers and a sprocket wheel for the said conveyor chain, the said sprocket wheel being mounted upon the frame below the inspection head and positioned so that the carriers move along a path directly below the opening of the inspection head, and means for catching articles which have passed through the inspection head including a holder adapted to be released to deposit an article in a carrier, and carrier means for the said holder supported by the said frame and adapted to move said holder at a speed substantially equal to that of the article while the holder is moving downward from the inspection head and to bring the holder to a rest position immediately above the carrier.

10. In a sorting machine adapted to inspect an article while the article is falling freely an inspection head which has an opening for the passage of falling articles, a frame adapted to support the inspection head, a conveyor for carrying articles from the inspection head to an assorting apparatus after inspection comprising a conveyor chain carrying a plurality of spaced carriers and a sprocket wheel for the said conveyor chain, the said sprocket wheel being mounted upon the frame below the inspection head and positioned so that the carriers move along a path directly below the opening of the inspection head, means interposed between said inspection head and the said conveyor for receiving the articles after they have fallen through the opening in the inspection head and reducing their speed to substantially zero without damaging the articles, and drive means for the said conveyor.

11. In a sorting machine adapted to inspect an article while the article is falling freely an inspection head which has an opening for the passage of falling articles, a frame adapted to support the inspection head, a conveyor for carrying articles from the inspection head to an assorting apparatus after inspection comprising a conveyor chain carrying a plurality of spaced carriers and a sprocket wheel for the said conveyor chain, the said sprocket wheel being mounted upon the frame below the inspection head and positioned so that the carriers move along a path below the opening of the inspection head, and means for catching the articles which have fallen through the inspection head with a cycle of motion equal in duration to the time for successive carriers to come into position and depositing each article in a conveyor carrier.

12. An article catcher comprising the combination of arm means, a support for said arm means including a shaft, one end of said arm means being mounted upon said shaft so as to pivot about the shaft, an article holder mounted at the remaining end of the arm means comprising at least one pan member and a shaft for rotating the pan member, the said shaft being supported by the arm means, and actuating means for the said pan member comprising a rotary actuating member, spring means engaging the actuating member for maintaining the pan in a first normal position, and detent means for holding the pan in a second normal position, and means for reciprocating the said arm means.

13. An article catcher comprising the combination of arm means, a support for said arm means including a shaft, one end of said arm means being mounted upon said shaft so as to pivot about the shaft, an article holder mounted at the remaining end of the arm means comprising at least one pan member and a shaft for rotating the pan member, the said shaft being supported by the arm and actuating means for the said pan members comprising a rotary actuating member, a spring means engaging the actuating member for maintaining the pan in a normally open position, and detent means for holding the pan in a closed position, and means for reciprocating the said arm means, the said reciprocating means comprising a shaft and a cam upon the shaft operatively engaging the said arm means, the said cam having a portion of increasing radius and a portion of decreasing radius for increasing and decreasing the speed of movement of the arm means upon rotation of the shaft.

14. An article catcher comprising the combination of arm means, a support for said arm means including a shaft, one end of said arm means being mounted upon said shaft so as to pivot about the shaft, an article holder mounted at the remaining end of the arm means comprising two generally arcuate pan members and shafts for rotating the pan members supported by the arm means, and actuating means for the said pan members comprising pinion gears mounted upon the said shafts and interengaged for opposing rotations, and an actuating pinion, spring means engaging the actuating pinion for maintaining the pans in a normally open position, and detent means for holding the pans in a closed position, and means for reciprocating the said arm means, the said reciprocating means comprising a shaft and a cam upon the shaft operatively engaging the said arms means, the said cam having a portion of increasing radius and a portion of decreasing radius for increasing and decreasing the speed of movement of the arm means upon rotation of the shaft.

15. An article catcher comprising the combination of arm means, a support for said arm means including a shaft, one end of said arm means being mounted upon said shaft so as to pivot about the shaft, an article holder mounted at the remaining end of the arm means comprising at least one pan member and a shaft for rotating the pan member, the said shaft being supported by the arm means and actuating means for the said pan member comprising a rotary actuating member, spring means engaging the actuating member for maintaining the pan in a normally open position, and detent means for holding the said pan in a closed position.

References Cited in the file of this patent

UNITED STATES PATENTS

| | | |
|---|---|---|
| 1,175,984 | Pearson | Mar. 21, 1916 |
| 1,680,880 | Hartrampf et al. | Aug. 14, 1928 |

FOREIGN PATENTS

| | | |
|---|---|---|
| 676,989 | Great Britain | Aug. 6, 1952 |